(12) United States Patent
Chen

(10) Patent No.: US 9,336,102 B2
(45) Date of Patent: May 10, 2016

(54) SYSTEMS AND METHODS FOR PREVENTING INPUT/OUTPUT PERFORMANCE DECREASE AFTER DISK FAILURE IN A DISTRIBUTED FILE SYSTEM

(71) Applicant: Dell Products L.P., Round Rock, TX (US)

(72) Inventor: Xin Chen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 14/257,140

(22) Filed: Apr. 21, 2014

(65) Prior Publication Data

US 2015/0301909 A1    Oct. 22, 2015

(51) Int. Cl.
*G06F 11/00*    (2006.01)
*G06F 11/20*    (2006.01)
*G06F 11/30*    (2006.01)
*G06F 11/07*    (2006.01)

(52) U.S. Cl.
CPC .......... *G06F 11/203* (2013.01); *G06F 11/0727* (2013.01); *G06F 11/2069* (2013.01); *G06F 11/2094* (2013.01); *G06F 11/3034* (2013.01); *G06F 2201/80* (2013.01)

(58) Field of Classification Search
CPC ............ G06F 11/2094; G06F 11/2069; G06F 11/0727; G06F 11/3034
See application file for complete search history.

(56) References Cited

U.S. PATENT DOCUMENTS

| 5,493,676 A * | 2/1996 | Amundson | G11C 29/765 711/117 |
| 2001/0047482 A1* | 11/2001 | Harris | G06F 11/0727 726/26 |
| 2003/0237019 A1* | 12/2003 | Kleiman | G06F 11/1092 714/6.32 |
| 2013/0013566 A1* | 1/2013 | Miller | G06F 11/2069 707/655 |

* cited by examiner

*Primary Examiner* — Charles Ehne
(74) *Attorney, Agent, or Firm* — Jackson Walker L.L.P.

(57) ABSTRACT

In accordance with embodiments of the present disclosure, a method may include receiving from a plurality of data nodes of a distributed file system an indication of whether a fault condition exists with respect to a storage resource of the respective data node. The method may also include receiving an input/output request for a storage resource of a particular data node from a host information handling system communicatively coupled to the distributed file system. The method may further include, responsive to the input/output request, directing the input/output request to the particular data node if no fault condition exists with respect to storage resources of the particular data node and directing the input/output request to another data node of the distributed file system if a fault condition exists with respect to one or more storage resources of the particular data node.

12 Claims, 3 Drawing Sheets

SYSTEMS AND METHODS FOR PREVENTING INPUT/OUTPUT PERFORMANCE DECREASE AFTER DISK FAILURE IN A DISTRIBUTED FILE SYSTEM

TECHNICAL FIELD

The present disclosure relates in general to information handling systems, and more particularly to management of a distributed file system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Dedicated storage solutions are commonplace in the market, particularly in the implementation of data centers. Such storage solutions may be in the form of network-based solutions which are often implemented as or part of a storage area network (SAN) employing Internet Small Computer System Interface (iSCSI), Fibre Channel, or other suitable communications standards. In some instances, a distributed storage system may be used as a storage solution. In a distributed file system, data may be spread across multiple storage nodes, which may allow for redundancy and increased performance.

When a disk within a storage node of a distributed file system fails, the distributed file system is typically rebuilt to reconstruct or recover the data of the failed disk, such rebuild being enabled by redundant data stored on the distributed file system. However, during such rebuild process, input/output (I/O) performance of client information handling systems attempting to access storage nodes may be degraded. In addition, the rebuild process may take significant amounts of time, especially when storage nodes are serving intensive I/O requests.

SUMMARY

In accordance with the teachings of the present disclosure, the disadvantages and problems associated with traditional approaches to file system management have been reduced or eliminated.

In accordance with embodiments of the present disclosure, a method may include receiving from a plurality of data nodes of a distributed file system an indication of whether a fault condition exists with respect to a storage resource of the respective data node. The method may also include receiving an input/output request for a storage resource of a particular data node from a host information handling system communicatively coupled to the distributed file system. The method may further include, responsive to the input/output request, directing the input/output request to the particular data node if no fault condition exists with respect to storage resources of the particular data node and directing the input/output request to another data node of the distributed file system if a fault condition exists with respect to one or more storage resources of the particular data node.

In accordance with these and other embodiments of the present disclosure, an information handling system may include a processor and a computer-readable medium having stored thereon a program of instructions. The program of instructions may be configured to, when read and executed by the processor receive from a plurality of data nodes of a distributed file system an indication of whether a fault condition exists with respect to a storage resource of the respective data node, receive an input/output request for a storage resource of a particular data node from a host information handling system communicatively coupled to the distributed file system, and, responsive to the input/output request, direct the input/output request to the particular data node if no fault condition exists with respect to storage resources of the particular data node, and direct the input/output request to another data node of the distributed file system if a fault condition exists with respect to one or more storage resources of the particular data node.

In accordance with these and other embodiments of the present disclosure, an article of manufacture may include a non-transitory computer readable medium and computer-executable instructions carried on the computer readable medium. The instructions may be readable by a processor and, when read and executed, may causing the processor to receive from a plurality of data nodes of a distributed file system an indication of whether a fault condition exists with respect to a storage resource of the respective data node, receive an input/output request for a storage resource of a particular data node from a host information handling system communicatively coupled to the distributed file system and responsive to the input/output request, direct the input/output request to the particular data node if no fault condition exists with respect to storage resources of the particular data node and direct the input/output request to another data node of the distributed file system if a fault condition exists with respect to one or more storage resources of the particular data node.

Technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
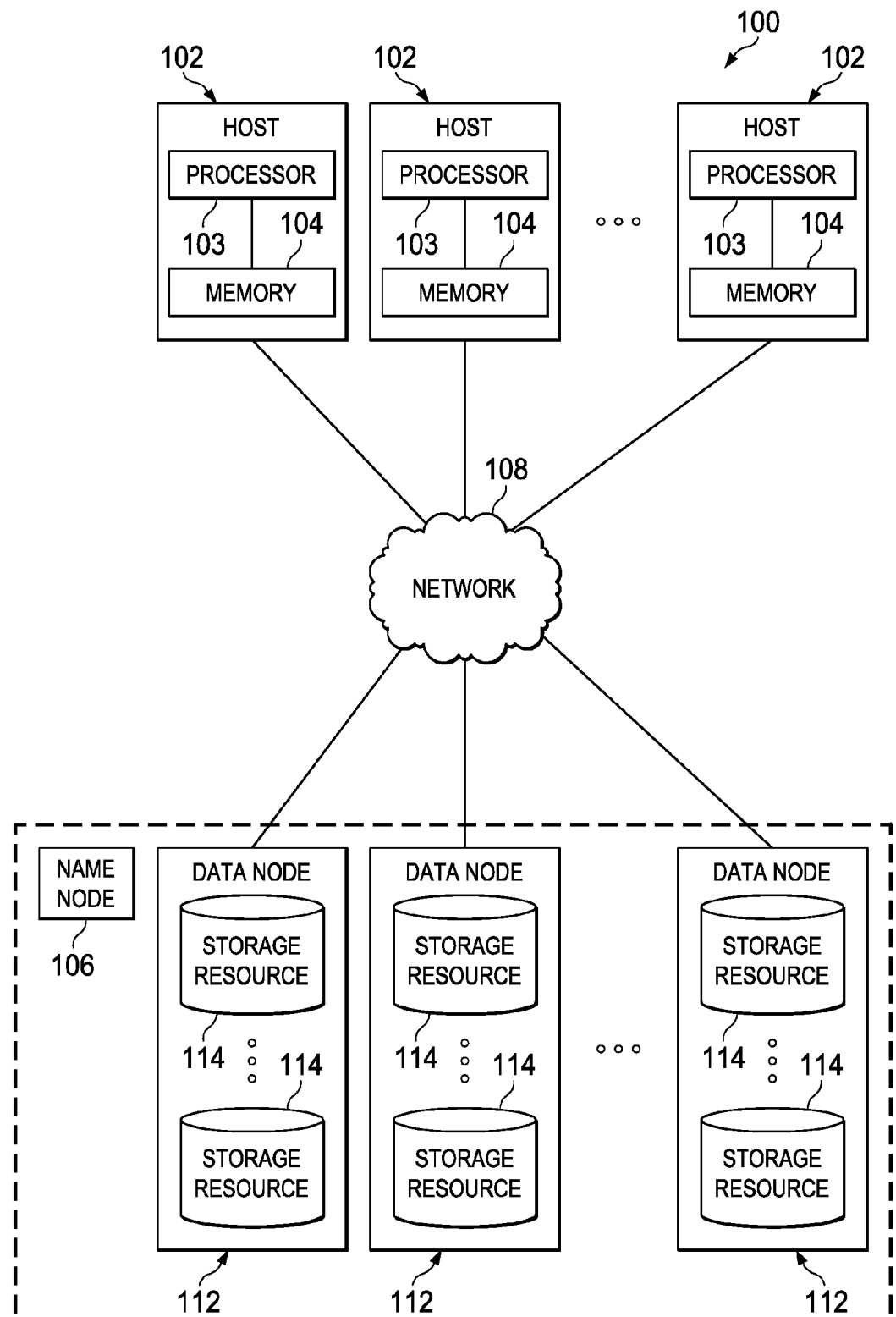
FIG. 1 illustrates a block diagram of an example storage system, in accordance with certain embodiments of the present disclosure.

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

An information handling system may include or may be coupled to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage array.

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity generation/checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 illustrates a block diagram of an example storage system 100, in accordance with certain embodiments of the present disclosure. As depicted in FIG. 1, system 100 may include one or more hosts 102 and a distributed file system 110 communicatively coupled to hosts 102 via a network 108.

A host 102 may comprise an information handling system. A host 102 may generally be operable to receive data from and/or communicate data to one or more storage resources 114 via network 108. In certain embodiments, host 102 may be a server. In another embodiment, host 102 may be a dedicated storage system such as, for example, a network attached storage (NAS) system responsible for operating on the data in a storage array (e.g., a distributed file system 110 comprising storage resources 114) and sending and receiving data from hosts coupled to the storage system. As depicted in FIG. 1, a host 102 may include a processor 103 and a memory 104 communicatively coupled to processor 103.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in an associated memory 104, stored in distributed file system 110, and/or another component of a host 102 and/or system 100.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to a host 102 is turned off.

In addition to a processor 103 and a memory 104, a host 102 may include one or more other information handling resources. An information handling resource may include any component system, device or apparatus of an information handling system, including without limitation a processor (e.g., processor 103), bus, memory (e.g., memory 104), input-output device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Network 108 may be a network and/or fabric configured to communicatively couple hosts 102 to each other and to distributed file system 110. In certain embodiments, network 108 may include a communication infrastructure, which provides physical connections, and a management layer, which organizes the physical connections of hosts 102, data nodes 112, and other devices coupled to network 108. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 108 and its various components may be implemented using hardware, software, or any combination thereof.

Distributed file system 110 may comprise a plurality of data nodes 112 for storing data. In some embodiments, distributed file system 110 may be configured to logically appear to each host 102 as a single logical storage unit. In other embodiments, distributed file system 110 may be configured such that portions thereof each appear to hosts 102 as multiple logical storage units. The various data nodes 112 may comprise part of one or more RAIDs and/or other suitable redundant storage array(s). As shown in FIG. 1, distributed file system 110 may include a name node 106 and a plurality of data nodes 112. In some embodiments, distributed file system 110 may comprise a Hadoop distributed file system.

A name node 106 may comprise an information handling system (e.g., a server) configured to manage a namespace of distributed file system 110 and regulate access by hosts 102 to files stored on data nodes 112. Accordingly, name node 106 may include a processor and a memory embodying instructions for performing the functionality of name node 106.

A data node 112 may comprise an information handling system (e.g., a server) configured to manage storage resources 114 integral to or attached to the data node. Thus, distributed file system 110 may operate in a master/slave architecture, whereby name node 106 is the master and data nodes 112 are the slaves. A data node 112 may include a processor and a memory embodying instructions for performing the functionality of the data node 112.

Storage resources 114 may include hard disk drives, magnetic tape libraries, optical disk drives, magneto-optical disk drives, compact disk drives, compact disk arrays, disk array controllers, and/or any computer-readable medium operable to store data. In some embodiments, storage resources 114 may form all or part of a redundant storage array.

In operation, distributed file system 110 exposes a file system namespace and allows user data from hosts 102 to be stored in files. A file to be stored on distributed file system 110 may be split into one or more blocks and such blocks may be stored in a set of data nodes 112. Name node 106 may execute file system namespace operations including opening, closing, and renaming files and directories, and may also determine mapping of blocks to data nodes 112. Data nodes 112 may be configured to serve read and write requests from hosts 102, and may be configured to perform block creation, deletion, and replication upon instruction from name node 106.

In addition, name node 106 and data nodes 112 may be configured to manage file system I/O in the event of a failure (e.g., disk drive failure) of a storage resource 114 of a data node 112 in order to reduce or eliminate degraded I/O performance during rebuild of such failure. Such functionality is illustrated below with reference to FIGS. 2 and 3.

Figure 2:
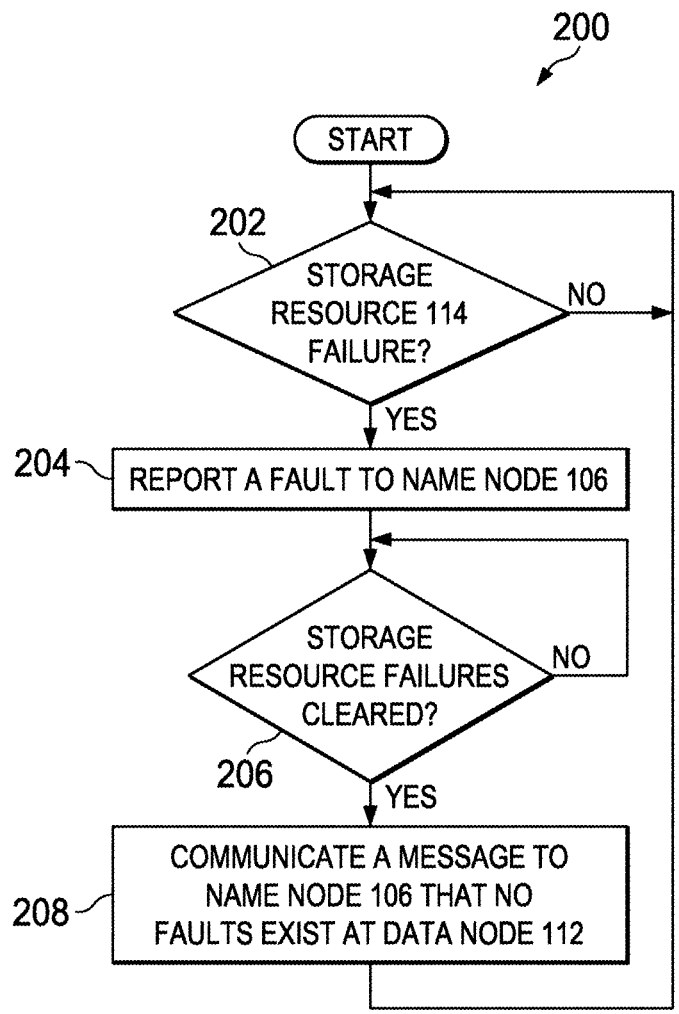
FIG. 2 illustrates a flow chart of an example method for managing a storage resource failure by a data node, in accordance with the present disclosure.

FIG. 2 illustrates a flow chart of an example method 200 for managing a storage resource failure by a data node 112, in accordance with the present disclosure. According to some embodiments, method 200 may begin at step 202. As noted above, teachings of the present disclosure may be implemented in a variety of configurations of storage system 100. As such, the preferred initialization point for method 200 and the order of the steps comprising method 200 may depend on the implementation chosen.

At step 202, a disk status detection monitor may execute on each data node 112. The disk status detection monitor may monitor storage resources 114 of a data node 112 for failure. In the event of such a failure, method 200 may proceed to step 204. Otherwise, method 200 may remain at step 202.

At step 204, in response to a failure of a component storage resource 114, a data node 112 may report a fault to name node 106.

At step 206, disk status detection monitor may continue to monitor storage resources 114 of a data node 112 for clearance of all failures (e.g., which may occur after a failed storage resource 114 is rebuilt). In the event of such all failures being cleared, method 200 may proceed to step 208. Otherwise, method 200 may remain at step 206.

At step 208, in response to all failures of storage resources 114 of a data node 112 being cleared, data node 112 may communicate a message to name node 106 that no faults exist at data node 112. After completion of step 208, method 200 may proceed again to step 202.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using storage system 100 or any other system operable to implement method 200. In certain embodiments, method 200 may be implemented partially or fully in software and/or firmware embodied in computer-readable media.

Figure 3:
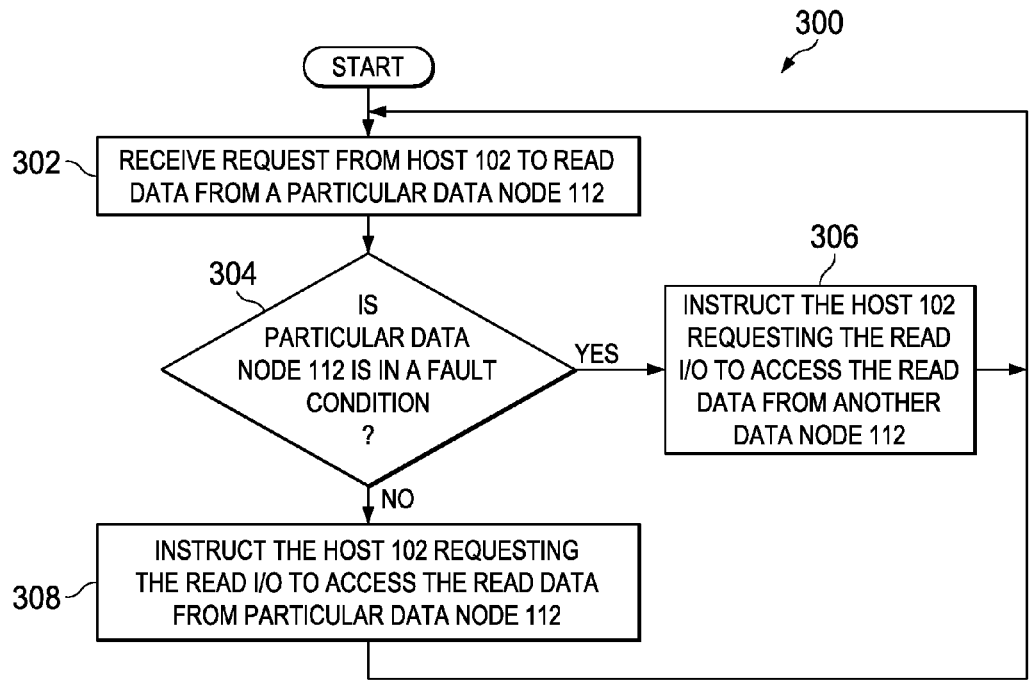
FIG. 3 illustrates a flow chart of an example method for managing read I/O by name node, in accordance with the present disclosure.

FIG. 3 illustrates a flow chart of an example method 300 for managing read I/O by name node 106, in accordance with the present disclosure. According to some embodiments, method 300 may begin at step 302. As noted above, teachings of the present disclosure may be implemented in a variety of configurations of storage system 100. As such, the preferred initialization point for method 300 and the order of the steps comprising method 300 may depend on the implementation chosen.

At step 302, name node 106 may receive a request from a host 102 to read data from a particular data node 112. At step 304, name node 106 may determine whether the particular data node 112 is in a fault condition. Such determination may be made based on fault messages received from such data node 112 (see FIG. 2 and description thereof). If a fault condition exists at such particular data node 112, method 300 may proceed to step 306. Otherwise, method 300 may proceed to step 308.

At step 306, in response to a determination that the particular data node 112 is in a fault condition, name node 106 may instruct the host 102 requesting the read I/O to access the read data from another data node 112 at which the data requested from the particular data node 112 is replicated. After completion of step 306, method 300 may proceed again to step 302.

At step 308, in response to a determination that the particular data node 112 is in a fault condition, name node 106 may instruct the host 102 requesting the read I/O to access the read data from the particular data node 112. After completion of step 308, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using storage system 100 or any other system operable to implement method 300. In certain embodiments, method 300 may be implemented partially or fully in software and/or firmware embodied in computer-readable media.

Figure 4:
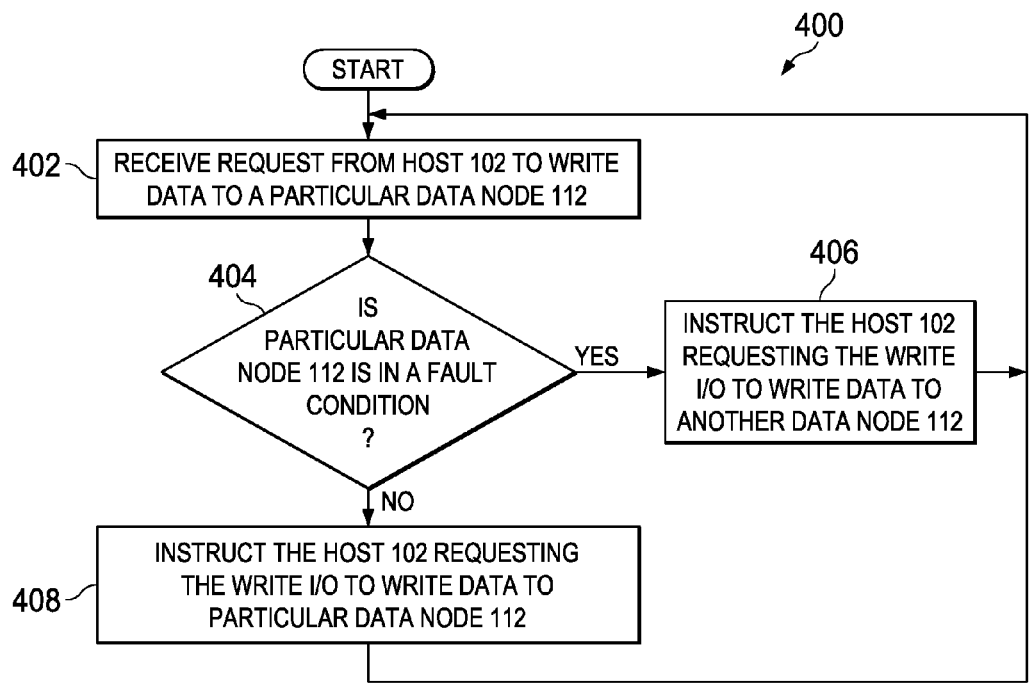
FIG. 4 illustrates a flow chart of an example method for managing write I/O by name node, in accordance with the present disclosure.

FIG. 4 illustrates a flow chart of an example method 400 for managing write I/O by name node 106, in accordance with the present disclosure. According to some embodiments, method 400 may begin at step 402. As noted above, teachings of the present disclosure may be implemented in a variety of configurations of storage system 100. As such, the preferred initialization point for method 400 and the order of the steps comprising method 400 may depend on the implementation chosen.

At step 402, name node 106 may receive a request from a host 102 to write data to a particular data node 112. At step 404, name node 106 may determine whether the particular data node 112 is in a fault condition. Such determination may be made based on fault messages received from such data node 112 (see FIG. 2 and description thereof). If a fault condition exists at such particular data node 112, method 400 may proceed to step 406. Otherwise, method 400 may proceed to step 408.

At step 406, in response to a determination that the particular data node 112 is in a fault condition, name node 106 may instruct the host 102 requesting the write I/O to write the I/O data to another data node 112 at which the data requested from the particular data node 112 is replicated. After completion of step 406, method 400 may proceed again to step 402.

At step 408, in response to a determination that the particular data node 112 is in a fault condition, name node 106 may instruct the host 102 requesting the write I/O to write the I/O data to the particular data node 112. After completion of step 408, method 400 may proceed again to step 402.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using storage system 100 or any other system operable to implement method 400. In certain embodiments, method 400 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A method comprising:
receiving from a plurality of data nodes of a Hadoop distributed file system an indication of whether a fault condition exists with respect to a storage resource of the respective data node;
receiving an input/output request for a storage resource of a particular data node from a host information handling system communicatively coupled to the Hadoop distributed file system; and
responsive to the input/output request:
directing the input/output request to the particular data node if no fault condition exists with respect to storage resources of the particular data node; and
directing the input/output request to another data node of the Hadoop distributed file system if a fault condition exists with respect to one or more storage resources of the particular data node.

2. The method of claim 1, wherein the input/output request comprises a read request.

3. The method of claim 1, wherein the input/output request comprises a write request.

4. The method of claim 1, wherein the fault condition comprises a disk failure associated with the storage resource.

5. An information handling system comprising:
a processor; and
a computer-readable medium having stored thereon a program of instructions configured to, when read and executed by the processor:
receive from a plurality of data nodes of a Hadoop distributed file system an indication of whether a fault condition exists with respect to a storage resource of the respective data node;
receive an input/output request for a storage resource of a particular data node from a host information handling system communicatively coupled to the Hadoop distributed file system; and
responsive to the input/output request:
direct the input/output request to the particular data node if no fault condition exists with respect to storage resources of the particular data node; and
direct the input/output request to another data node of the Hadoop distributed file system if a fault condition exists with respect to one or more storage resources of the particular data node.

6. The information handling system of claim 5, wherein the input/output request comprises a read request.

7. The information handling system of claim 5, wherein the input/output request comprises a write request.

8. The information handling system of claim 5, wherein the fault condition comprises a disk failure associated with the storage resource.

9. An article of manufacture comprising:
a non-transitory computer readable medium; and
computer-executable instructions carried on the computer readable medium, the instructions readable by a processor, the instructions, when read and executed, for causing the processor to:
receive from a plurality of data nodes of a Hadoop distributed file system an indication of whether a fault condition exists with respect to a storage resource of the respective data node;
receive an input/output request for a storage resource of a particular data node from a host information handling system communicatively coupled to the Hadoop distributed file system; and
responsive to the input/output request:
direct the input/output request to the particular data node if no fault condition exists with respect to storage resources of the particular data node; and
direct the input/output request to another data node of the Hadoop distributed file system if a fault condition exists with respect to one or more storage resources of the particular data node.

10. The article of claim 9, wherein the input/output request comprises a read request.

11. The article of claim 9, wherein the input/output request comprises a write request.

12. The article of claim 9, wherein the fault condition comprises a disk failure associated with the storage resource.

\* \* \* \* \*